Sept. 8, 1964    J. C. GARRETT    3,147,593
FUEL STORE
Filed Jan. 8, 1962    2 Sheets-Sheet 1
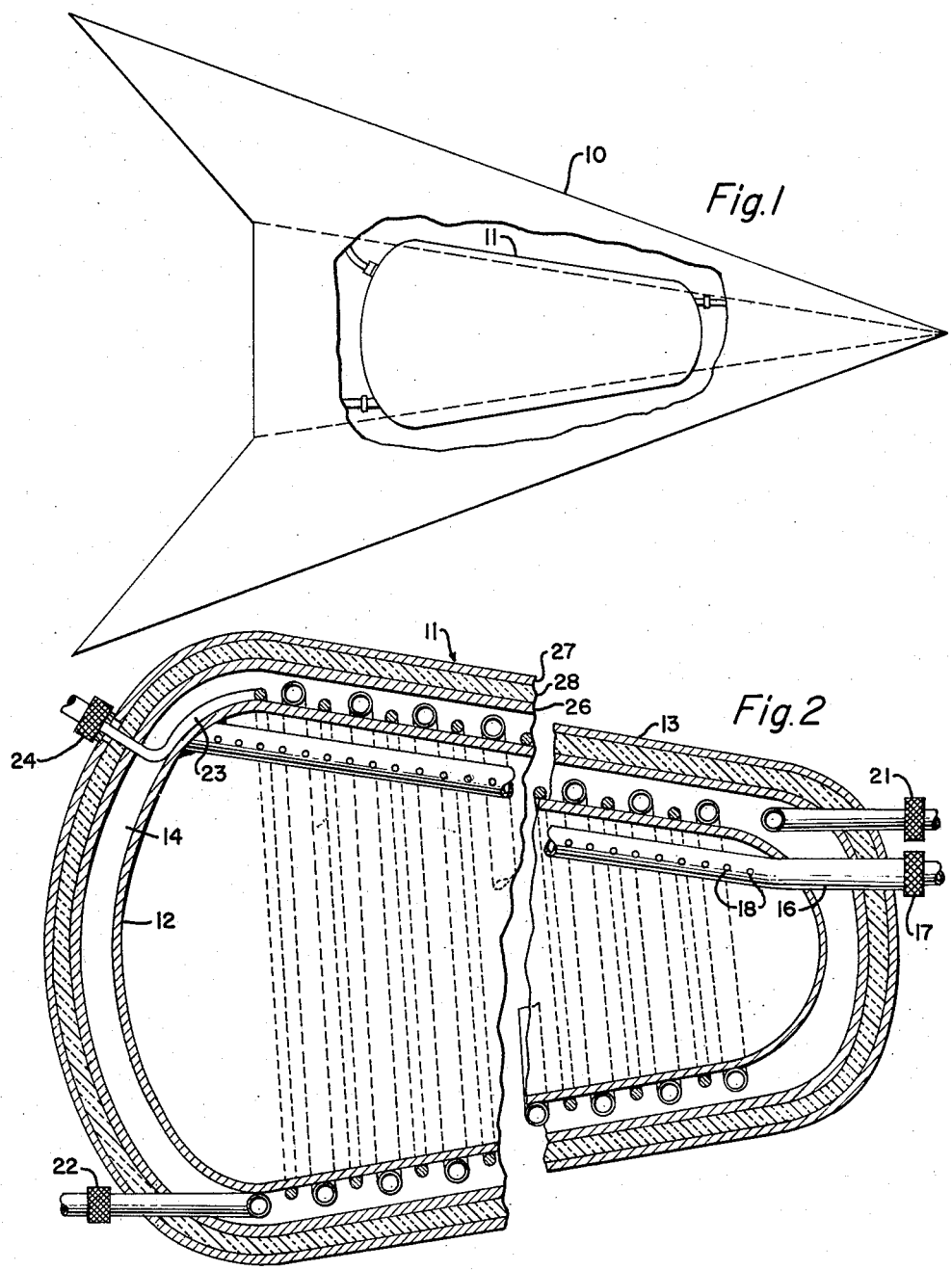
INVENTOR.
JOHN C. GARRETT,
BY
Agent.

Sept. 8, 1964   J. C. GARRETT   3,147,593
FUEL STORE
Filed Jan. 8, 1962   2 Sheets-Sheet 2
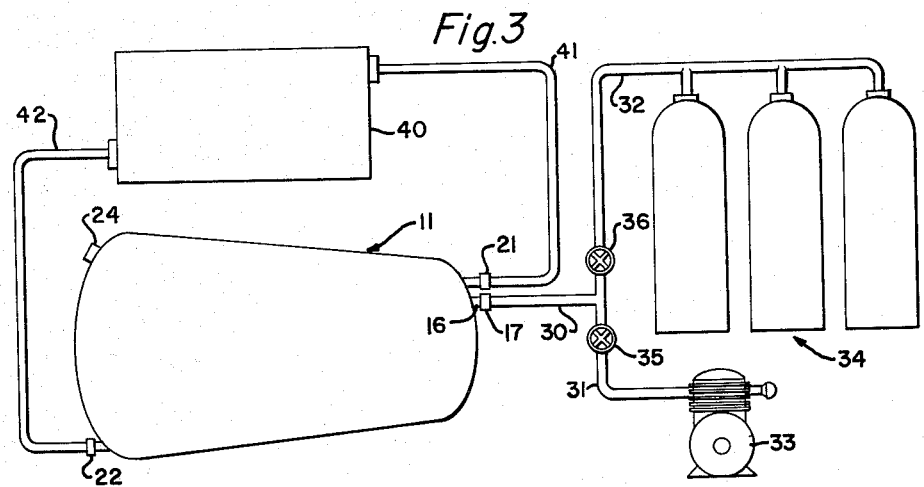
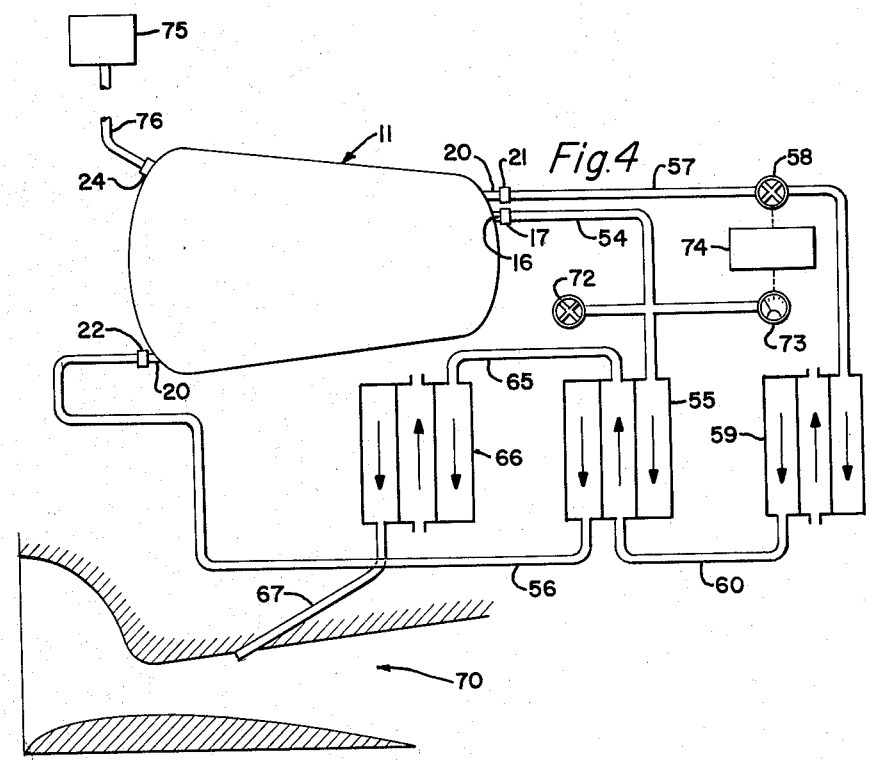
INVENTOR.
JOHN C. GARRETT,
BY
*William E. Martin*
Agent.

United States Patent Office 3,147,593
Patented Sept. 8, 1964

3,147,593
FUEL STORE
John C. Garrett, Beverly Hills, Calif., assignor to The Garrett Corporation, Los Angeles, Calif., a corporation of California
Filed Jan. 8, 1962, Ser. No. 164,933
1 Claim. (Cl. 60—39.46)

The present invention relates to a method for supplying combustible fuel to a heat engine and, more particularly, to a method and apparatus whereby the volume of tankage required to supply hydrogen fuel to a vehicular power plant may be materially reduced. It is an aim of the invention to provide means for storing hydrogen fuel at relatively low pressure and at higher density than would otherwise be possible even at super-critical pressure.

As is well known to those skilled in the art, the use of hydrogen as a fuel and as a working fluid in certain types of heat engine offers two significant advantages over other reactive media: first, its chemical fuel value, as measured in B.t.u. per pound or other convenient units, is substantially higher than that of other combustible fuels; and second, the relatively high specific heat of hydrogen makes it thermodynamically feasible, and in some cases advantageous, to establish and maintain combustion thereof at a fuel-air mixture ratio substantially richer than the chemically ideal or stoichiometric ratio, the product of such combustion being a high temperature working fluid of exceptionally high heat content. In thermodynamic cycles as used, for example, in reactive propulsion heat engines, a further advantage to be gained by the use of hydrogen fuel derives from the fact that under suitable aerodynamic conditions, a self-sustaining continuous detonation of a hydrogen and air mixture may be established, the heated product of such detonation being expanded rearwardly of a suitably designed aerothermodynamic duct to produce a desired propulsive thrust. Exemplary embodiments of vehicles and vehicular power plants adapted to take advantage of the aforementioned desirable properties of hydrogen fuel are described in co-pending U.S. patent applications, Serial No. 119,154, of Robert W. Gross, Leslie W. Norman and Skillman C. Hunter, entitled Method and Apparatus for Reaction Propulsion; and Serial No. 127,369, of Archibald P. Kelley and Leslie W. Norman, entitled Improvements in Engines.

Concomitant to the aforementioned advantages of hydrogen as a fuel and working fluid, however, is a substantial disadvantage, and one that has to a large extent militated against the more widespread adoption of hydrogen fuel for reaction propulsion devices as used in vehicular applications; namely, the extremely low density of hydrogen in its normally encountered gaseous state. Because of this low density the tankage required to contain a quantity of hydrogen sufficient for any reasonable period of combustion tends to be impracticably large. This disadvantage may be mitigated to some extent through the use of special tankage wherein hydrogen is stored in the gaseous phase at super-critical pressure or in the liquid phase at cryogenic temperature; even when such expedients are used, however, the density of the contained hydrogen is still less than is desirable and the fuel value thereof as measured in B.t.u. per cubic foot (rather than B.t.u. per pound) does not approach that of many well known hydrocarbon fuels. Since the total volume or space taken up by a given fuel system, as well as the weight of the fuel contained therein, may be of critical importance in power plant and vehicle design, the disadvantage inherent in the relatively low density of hydrogen may preclude its use in many applications in which the high chemical fuel value and high specific heat thereof would otherwise be highly desirable. The present invention contemplates a method and means for the alleviation of this difficulty through cryogenic storage of hydrogen fuel in the solid phase.

It is therefore an object of the present invention to provide a method and apparatus for storing hydrogen fuel in the solid phase. It is another object of the invention to provide a method and means for converting hydrogen from the solid to the gaseous phase for use in a heat engine.

It is another object of the invention to provide a readily removable fuel store for a vehicular power plant wherein hydrogen may be confined in the soild phase.

It is a still further object of the invention to provide a fuel store wherein hydrogen may be stored in the solid phase for a relataively loong period and converted, on demand and at a desired rate, to the gaseous phase for combustion in a heat engine.

It is yet another object of the invention to provide a storage container for hydrogen fuel incorporating heat exchange means adapted for heat transfer both to and from the interior thereof whereby a supply of hydrogen fuel may be frozen to the solid phase and reconverted to the gaseous phase in situ.

In order to accomplish these as well as other objects which will be made apparent hereinafter, the present invention comprehends a container for hydrogen fuel wherein a fluid medium may be circulated in heat transfer relation with the contained hydrogen either for refrigeration or heating thereof. In a preferred embodiment of the invention as herein disclosed, hydrogen is contained in a first inner vessel having heat exchange passage means coiled circumferentially thereof, the inner vessel and its associated heat exchange coils being in turn enclosed in a second or outer vessel spaced therefrom to define an intermediate annular chamber which may preferably be evacuated to oppose conductive and convective heat transfer between the respective vessels. The inner vessel is provided with a suitable pipe or conduit disposed internally thereof whereby gaseous hydrogen may be introduced to or withdrawn from the vessel, this pipe as well as the heat exchange passages coiled circumferentially of the inner vessel being terminated in quick disconnect means disposed externally of the outer vessel. Thus, the vessel may be charged with hydrogen by connection to a suitable source thereof in either the liquid or gaseous phase, and such hydrogen may be frozen to the solid phase in situ by connecting the heat exchange passage to an appropriate refrigeration apparatus such as a helium cryostat. As hydrogen characteristically undergoes an increase in density of approximately twenty-five percent in the transition from the liquid phase at 20° K. to the solid phase at 14° K., the pipe or conduit whereby the hydrogen is introduced into the inner vessel is preferably located near the top of the latter, thereby to permit the lower portion of the vessel to become progressively filled with solid hydrogen; thus, by judicious placement and design of this conduit it is possible to achieve substantially complete filling of the vessel so as to take maximum advantage of the increased density and concomitantly increased storage capacity made available by the reduction of hydrogen to the solid phase. When the desired filling and freezing processes have been brought to completion, the charging and refrigeration lines may be disconnected and the container may be transferred to the vehicle in which the hydrogen fuel is to be used, the quick disconnect fittings of the hydrogen conduit and the heat exchange passage being coupled to corresponding fittings aboard the vehicle.

With the container installed in a vehicle, the hydrogen conduit becomes a withdrawal line for supplying gaseous hydrogen to the vehicular power plant, the heat transfer passage being connected to a suitable heat exchange system aboard the vehicle whereby ambient heat may be transferred to the inner vessel at a rate sufficient to convert the hydrogen contained therein from the solid to the liquid or gaseous phase in accordance with the fuel requirement of the power plant.

As the frozen hydrogen constitutes a heat sink of relatively large capacity, and as the operation of high speed vehicles commonly imposes numerous and stringent requirements for the dissipation of undesired heat loads, the present invention contemplates the advantageous use of hydrogen as a cooling or heat transfer medium as well as a fuel. In this connection it is to be noted that by storing the hydrogen in the solid phase, the refrigerant capacity thereof is materially augmented not only by the added mass of hydrogen made available in consequence of the increased density characterizing this phase, but also by the substantial heat of fusion which becomes available for cooling purposes when the hydrogen is reconverted from solid to liquid phase and, further, by the heat of vaporization which becomes available in the subsequent conversion from the liquid to the gaseous phase.

The manner in which these and other advantages of the invention are achieved will be more clearly understood from the following description of a preferred embodiment thereof, reference being had to the accompanying drawings. In the drawings, which are to be regarded as merely illustrative, and in which like elements are designated by like reference numerals:

FIG. 1 is a plan view, partially broken away, showing an aircraft having a fuel store which embodies the invention.

FIG. 2 is a longitudinal section of the fuel store shown in FIG. 1.

FIG. 3 is a diagram illustrating an exemplary method of charging a fuel store according to the invention; and FIG. 4 is a diagram illustrating an exemplary method of discharging the fuel store into a vehicular power plant.

Referring first to FIG. 1, there is shown a hypersonic aircraft 10 of sagittal planform, the central or fuselage portion of the aircraft being provided with a fuel store 11 for supplying hydrogen fuel to a propulsive heat engine (not shown) which may, for example, be a hypersonic aerothermodynamic duct of the type disclosed in the copending application of Gross et al. hereinbefore referred to. The fuel store 11 comprises an inner vessel 12 and an outer vessel 13 spaced therefrom to define an intermediate chamber 14, the vessels 12 and 13 being of fluid-tight construction to preclude leakage and to permit evacuation of the intermediate chamber 14 for inhibition of convective and conductive heat transfer thereacross. In addition, the outer surface of the vessel 12 and the inner surface of the vessel 13 may preferably be provided with a specular or otherwise highly reflective finish to oppose radiative heat transfer across the space 14. A supply conduit 16 disposed longitudinally of the inner vessel 12 adjacent the top thereof terminates in a quick disconnect fitting 17 disposed exteriorly of the outer vessel 13, the interiorly disposed portion of the conduit being provided with a plurality of axially spaced apertures or foramina 18 for the accommodation of fluid flow therethrough.

A heat exchange passage 20 is disposed circumferentially of the inner vessel 12 and in heat transfer relation therewith, the passage 20 preferably being coiled to form a helix conforming to the exterior contour of the vessel and being provided with quick disconnect fittings 21 and 22 disposed exteriorly of the outer vessel 13 whereby the passage may be connected in circuit with a suitable heat transfer apparatus for circulation of a fluent heat exchange medium therethrough. In order to supplement the heating function of the heat exchange passage 20 and to overcome what may be unavoidable delays in the response of other portions of a heat transfer circuit associated therewith, an electrically energized heating element 23 may preferably be coiled interjacently therewith and in heat exchange relation with the vessel 12, the element 23 being also provided with quick disconnect terminal means 24 disposed externally of the vessel 13 whereby electrical energy may be supplied thereto from a suitable power supply aboard the vehicle in which the fuel store 11 is to be used.

In a preferred embodiment of the invention as shown in the drawing, the transfer of ambient heat to the inner vessel 12 may be inhibited to any desired degree by the provision of an insulative outer vessel 13 which is itself of double wall construction, the inner wall 26 and the outer wall 27 thereof being separated by an insulative space which may be evacuated or packed with insulative material such as evacuated perlite. (A particularly advantageous form of insulation for use in this application comprises closely packed alternate layers of specular metallic foil and felted glass fiber; an insulative material conforming to this description is sold by the Linde Company under the name Super Insulation.)

The manner in which a fuel store embodying the invention is charged with hydrogen, refrigerated and installed for use in connection with a vehicular power plant may best be understood by reference to FIGS. 3 and 4. In FIG. 3, a fuel store as hereinbefore described is shown diagrammatically in conjunction with an external source of hydrogen and a suitable refrigeration apparatus which may, for example, be a helium cryostat. As shown in the drawing, the internal hydrogen conduit 16 of a fuel store 11 is connected by means of quick disconnect fitting 17 with an external conduit 30 having branches 31 and 32 which communicate, respectively, with a vacuum pump 33 and a hydrogen source 34, the vacuum pump and hydrogen source being selectively connectable in flow path with the conduit 16 by means of isolation valves 35 and 36. A helium cryostat 40 is connected by means of external conduits 41, 42 and quick disconnect fittings 21, 22 with the heat exchange passage 20 disposed internally of fuel store 11.

In order to charge the fuel store 11 with hydrogen in the solid phase, the inner vessel 12 is first evacuated by means of the pump 33, isolation valve 35 being placed in the open position and isolation valve 36 in the closed position during this part of the cycle. When all atmospheric or other residual gas has been exhausted from the inner vessel 12 of fuel store 11, isolation valve 35 is placed in the closed position and the inner vessel is pre-cooled by means of the cryostate 40, low temperature helium being circulated thereby through the internal heat exchange passage 20 until a desired temperature has been attained. With the wall of the inner vessel 12 pre-cooled to a suitably low temperature, for example 10° K., the isolation valve 36 is opened so as to place the supply 34 in communication with the internal conduit 16, the resulting influx of fluid hydrogen into the inner vessel 12 being refrigerated by heat transfer to the helium-cooled wall thereof. It is to be understood, of course, that while the hydrogen supply 34 has been shown, for illustrative purposes only, as comprising a plurality of tanks or bottles such as are commonly used for storage of fluids in the gaseous phase, alternate supply means wherein hydrogen is stored cryogenically as a liquid may, of course, be used. Further, it is anticipated that passages 30 and 32 may include supplementary heat exchange means whereby hydrogen flowing therethrough may be pre-cooled to a temperature approaching the lower limit of the liquid phase, such means, which are well known to those skilled in the art, being omitted from the instant drawing for the sake of clarity.

As hydrogen enters the inner vessel 12 and is refrigerated by heat transfer to the helium cooled wall thereof, it will be progressively converted to the solid phase and the resulting hydrogen precipitation will settle, by virtue of its density, into the lower portion of the vessel where it will coalesce into a solid body of hydrogen "ice." Thus, a continuously increasing mass of solid hydrogen will be built up in the lower portion of the vessel, and as additional fluid hydrogen is admitted to the vessel, the upper surface of the frozen mass will be progressively raised until it attains the level of the internal conduit 16. When flow through the foramina 18 provided in the wall of teh conduit 16 has been totally obstructed by condensation of hydrogen to the solid phase adjacent thereto, the fuel store 11 is fully charged and in condition for transfer to the vehicle in which it is to be used. It is to be understood, however, that such transfer need not be effected immediately as the insulative structure of the outer vessel 13 makes it feasible to retain the fuel store 11 in a fully charged condition for an extended period, the refrigerative load imposed on the helium cryostat 40 by such retention being minimal.

An exemplary mode of installation of the charged fuel store for use in connection with a vehicular power plant is diagrammatically illustrated in FIG. 4, it being assumed for the purpose of the following description that such installation is embodied in a hypersonic aircraft as shown for example, in FIG. 1. The internal hydrogen supply conduit 16 is coupled by means of quick disconnect fitting 17 to an external recirculation passage 54 which includes a heat exchanger 55 whereby heat may be transferred to the hydrogen flowing therethrough, such heat being derived from an environmental source in a manner to be described hereinafter. Hydrogen vapor heated by the exchanger 55 is conducted via a passage 56 and quick disconnect fitting 22 to the internal heat exchange passage 20 and thence via quick disconnect fitting 21 to an external passage 57. In the internal heat exchange passage 20, the heat acquired by the hydrogen in the external heat exchanger 55 is transferred to the contents of the inner vessel 12, thereby converting a portion of the hydrogen stored therein from the solid to the gaseous phase, the resulting gaseous hydrogen being delivered via the supply conduit 16 to the recirculation passage 54 for sustaining the described cycle. The cooled hydrogen delivered from internal heat exchange passage 20 to the external passage 57 is conducted, via flow metering valve 58, to a second external heat exchanger 59 wherein the hydrogen temperature is again raised by transfer of ambient heat thereto. Thus, heat exchanger 59 may comprise a skin-cooling device for dissipation of aerodynamically generated heat in the region of an aircraft outer surface, an element of a crew compartment environmental control system, means for dissipating heat generated by electrical and control equipment, or other apparatus for dissipating a heat load of calculably suitable magnitude.

The heated hydrogen delivered from heat exchanger 59 is in turn conducted via a passage 60 to the first external heat exchanger 55, wherein its heat content is transferred to the hydrogen expelled from the inner vessel 12 via supply conduit 16 and recirculation passage 54. Thus, the hydrogen which is expelled from the heat exchanger 55 via passage 56 is at a relatively high temperature, as is desired for vaporizing the contents of the fuel store 11; and the hydrogen which is expelled from the heat exchanger 55 by way of passage 65 is at a relatively low temperature and may be advantageously used in the fulfillment of desired refrigeration or environmental control functions. The relatively cold hydrogen delivered from the heat exchanger 55 is therefore conducted via the passage 65 to a third external heat exchanger 66 wherein it is once more heated, as in heat exchanger 59 by acquisition of ambient or adventitious environmental heat, to a desired temperature range for delivery via a passage 67 to a propulsive heat engine 70 for combustion therein. (In the drawing, the heat engine 70 is diagrammatically shown as comprising an aerothermodynamic duct of the type described in the co-pending application of Gross et al. hereinbefore more particularly referred to; however, it is to be understood that the invention is equally well adapted for use with other types of heat engine as known in the art.)

As shown in the drawing, the fuel store 11 may preferably be provided with a suitable pressure relief valve 72 whereby superfluous hydrogen vapor may be released, for example, via a suitable overboard vent system (not shown). In addition, appropriate pressure sensing means 73 may provide visual display of hydrogen pressure for the information of operating personnel and may be operatively connected with control apparatus 74 whereby the position of flow metering valve 58 may be positioned in accordance with a desired rate of fuel delivery to heat engine 70.

It will be apparent from the foregoing description of an exemplary cycle that so long as an adequate source of ambient heat is available for transfer to the gaseous hydrogen in heat exchanger 59, the above described cycle will be self-sustaining and will continue until it is intentionally arrested by closure of the valve 58 or until the supply of hydrogen in the fuel store 11 is exhausted. In order to initiate the cycle, however, it is desirable to have available a source of heat whereby a portion of the solid hydrogen contained in the fuel store may be rapidly vaporized. For this reason the hereinbefore described heating element 23 is provided and is connected by means of quick disconnect terminal 24 and a conductive cable 76 with an electric power supply 75 whereby it may be energized or de-energized at will. Thus, when the vehicle in which the fuel store is installed has attained a speed at which it is desired to use the propulsive heat engine 70, the heating element 23 may be energized to initiate flow of gaseous hydrogen through the hereinbefore described system of internal and external heat exchangers; and when such flow has achieved a self-sustaining condition, the heating element may be de-energized. It is to be understood, of course, that the heating element 23 may also be used to supplement the internal heat exchange passage 20 in circumstances wherein the fuel demand of heat engine 70 exceeds the hydrogen vaporization capacity of the heat transfer system comprising the passage 20 and external heat exchangers 55, 59 and 66, and for this purpose it is contemplated that the power supply 75 may be made responsive to the fuel metering apparatus 74.

As will be apparent from the foregoing particular description thereof, the present invention comprehends a novel method and apparatus whereby hydrogen may be stored in the solid phase and consequently used to greater advantage, as a fuel and working fluid for a propulsive heat engine, than has been heretofore possible. While the invention has been disclosed with reference to a single preferred embodiment for use in a hypersonic aircraft, it is anticipated that those skilled in the art will have occasion to practice numerous variations on specific features thereof, and it is my desire that all such variations falling within the spirit and scope of the invention be secured to me by Letters Patent.

I claim:

A cryogenic storage container for storing a cryogenic fuel in its solid phase, comprising:
- an inner vessel;
- an outer vessel enclosing said inner vessel in spaced relation to the latter and defining an insulative space circumjacent the inner vessel;
- said space being evacuated to oppose conductive and convective heat transfer between said vessels;
- a first conduit wrapped around said inner vessel and having open ends located externally of said outer vessel;
- a coupling on each externally located end of said conduit for releasable connection to an external fluid line;
- a second conduit opening at one end to the interior of said inner vessel and having an opposite open end located externally of said outer vessel;
- a coupling on the externally located end of said second conduit for releasable connection to an external fluid line;
- first, second, and third heat exchangers each including first and second fluid passages disposed in heat transfer relation to one another;

means releasably coupled to the externally located end of said second conduit and communicating the passage in the latter conduit to one end of one passage in said first heat exchanger;

means releasably coupled to one externally located end of said first conduit and communicating the passage in the latter conduit to the other end of said one passage in said first heat exchanger;

means releasably coupled to the other externally located end of said first conduit and communicating the passage in the latter conduit to one end of one passage in said second heat exchanger;

means communicating the other end of said latter passage to one end of the other passage in said first heat exchanger;

means communicating the other end of said latter passage to one end of one passage in said third heat exchanger;

means for conveying fluid from the other end of said latter passage to a point of use; and the other passages of said second and third heat exchangers being adapted to receive a relatively hot fluid.

References Cited in the file of this patent

UNITED STATES PATENTS

| | | |
|---|---|---|
| 1,680,873 | Girardville | Aug. 14, 1928 |
| 1,863,958 | Wulff | June 21, 1932 |
| 2,166,637 | McIlrath | July 18, 1939 |
| 2,265,110 | Brauer | Dec. 2, 1941 |
| 2,712,730 | Spangler | July 12, 1955 |
| 2,979,293 | Mount | Apr. 11, 1961 |
| 2,999,366 | Fave | Sept. 12, 1961 |
| 3,049,870 | Chamberlain | Aug. 21, 1962 |

FOREIGN PATENTS

| | | |
|---|---|---|
| 1,248,443 | France | Nov. 7, 1960 |